United States Patent
Gärtner et al.

(10) Patent No.: US 8,428,807 B2
(45) Date of Patent: Apr. 23, 2013

(54) METHOD FOR DETERMINING AT LEAST ONE DISPLACEMENT STATE OF A VEHICLE BODY

(75) Inventors: Andreas Gärtner, Bremen (DE); Eberhard Hees, Geldersheim (DE); Stefan Rappelt, Gerolzhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1220 days.

(21) Appl. No.: 12/160,358

(22) PCT Filed: Jan. 10, 2007

(86) PCT No.: PCT/DE2007/000047
§ 371 (c)(1),
(2), (4) Date: Jul. 9, 2008

(87) PCT Pub. No.: WO2007/079733
PCT Pub. Date: Jul. 19, 2007

(65) Prior Publication Data
US 2010/0228422 A1    Sep. 9, 2010

(30) Foreign Application Priority Data
Jan. 10, 2006  (DE) .......................... 10 2006 001 436

(51) Int. Cl.
G01M 17/00  (2006.01)
G06F 7/00  (2006.01)
G06F 11/30  (2006.01)
G06F 19/00  (2006.01)
C07C 5/00  (2006.01)

(52) U.S. Cl.
USPC .................. 701/29.1; 701/1; 701/36; 701/37; 701/38; 701/48; 280/5.5; 280/5.504; 280/5.507; 280/5.512

(58) Field of Classification Search ................. 701/1, 29, 701/36, 37, 38, 48, 91; 280/5.5, 5.504, 5.507, 280/5.512
See application file for complete search history.

(56) References Cited

U.S. PATENT DOCUMENTS
4,696,489 A * 9/1987 Fujishiro et al. ............ 280/5.519
4,827,771 A * 5/1989 Cary et al. ....................... 73/644
(Continued)

FOREIGN PATENT DOCUMENTS
DE 41 12 603 Al 10/1991
DE 42 18 087 C2 3/2001
(Continued)

*Primary Examiner* — Khoi Tran
*Assistant Examiner* — Jamie Figueroa
(74) *Attorney, Agent, or Firm* — McGlew and Tuttle, P.C.

(57) ABSTRACT

Process for determining at least one state of motion of a vehicle body (10) of a vehicle (1), which has at least one wheel (2) spring-mounted on the vehicle body (10) via a wheel suspension (6), wherein an inward deflection ($z_{rel}$) of the wheel (2) is measured by means of a path or angle sensor (21), an inward deflection velocity ($\dot{z}_{rel}$) of the wheel (2) is determined by differentiating the inward deflection ($z_{rel}$) of the wheel (2) over time, a vertical acceleration ($\ddot{z}_{wheel}$) of the wheel (2) is measured by means of an acceleration sensor (22), a vertical velocity ($\dot{z}_{wheel}$) of the wheel (2) is determined by integrating the vertical acceleration ($\ddot{z}_{wheel}$) of the wheel (2) over time, and a vertical velocity ($\dot{z}_{body}$) of the vehicle body (10) is calculated by forming a difference of the vertical velocity ($\dot{z}_{wheel}$) of wheel (2) and the inward deflection velocity ($\dot{z}_{rel}$) of wheel (2).

20 Claims, 10 Drawing Sheets

U.S. PATENT DOCUMENTS

| | | | |
|---|---|---|---|
| 4,916,632 A * | 4/1990 | Doi et al. | 700/280 |
| 5,071,157 A | 12/1991 | Majeed | |
| 5,193,844 A | 3/1993 | Butsuen et al. | |
| 5,203,584 A | 4/1993 | Butsuen et al. | |
| 5,324,069 A * | 6/1994 | Ogawa | 280/5.515 |
| 5,346,242 A * | 9/1994 | Karnopp | 280/5.514 |
| 5,432,700 A | 7/1995 | Hrovat et al. | |
| 5,510,985 A * | 4/1996 | Yamaoka et al. | 701/37 |
| 5,510,988 A | 4/1996 | Majeed et al. | |
| 5,570,288 A * | 10/1996 | Badenoch et al. | 701/37 |
| 5,606,503 A * | 2/1997 | Shal et al. | 701/1 |
| 5,931,879 A | 8/1999 | Neumann et al. | |
| 5,944,763 A * | 8/1999 | Iwasaki | 701/37 |
| 6,259,982 B1 | 7/2001 | Williams et al. | |
| 6,633,803 B1 * | 10/2003 | Shal et al. | 701/37 |
| 6,847,874 B2 | 1/2005 | Stiller | |
| 2005/0178628 A1 | 8/2005 | Uchino et al. | |

FOREIGN PATENT DOCUMENTS

| | | |
|---|---|---|
| EP | 0 321 078 | 6/1989 |
| JP | 03 092413 | 4/1991 |
| JP | H04-500191 A | 1/1992 |
| JP | 2005-255152 A | 9/2005 |

* cited by examiner

METHOD FOR DETERMINING AT LEAST ONE DISPLACEMENT STATE OF A VEHICLE BODY

CROSS REFERENCE TO RELATED APPLICATIONS

This application is a United States National Phase application of International Application PCT/DE2007/000047 and claims the benefit of priority under 35 U.S.C. §119 of German patent application 10 2006 001 436.7 filed 10 Jan. 2006, the entire contents of which are incorporated herein by reference.

FIELD OF THE INVENTION

The present invention pertains to a process for determining at least one state of motion of a vehicle body of a vehicle, which has at least one wheel spring-mounted on the vehicle body via a wheel suspension, wherein an inward deflection of the wheel is measured by means of a path or angle sensor, and a velocity of inward deflection of the wheel is determined by the time differentiation of the inward deflection of the wheel. The present invention pertains, furthermore, to a vehicle with a vehicle body, at least one wheel, which is spring-mounted on the vehicle body via a wheel suspension, at least one acceleration sensor and at least one path or angle sensor, which is arranged in the wheel suspension and by means of which the inward deflection of the wheel can be detected, and with a differentiator arranged downstream of the path or angle sensor. In addition, the present invention pertains to the use of such a vehicle for carrying out the above-mentioned process.

BACKGROUND OF THE INVENTION

Sensor systems for the technical measuring determination of degrees of freedom of motion of the body and chassis in vehicles can be embodied in different ways, the determination of the degrees of freedom of motion being carried out, for example.

By measuring run or propagation times, i.e., by means of a sensor system, which is arranged in the area of the wheel suspension and/or the body, emits electromagnetic waves and determines a corresponding relative distance by the run/propagation time measurement in relation to a corresponding object. In principle, variables relative to a defined reference system, also derived over time, are possible. The technique can be used, for example, for the dynamic detection of the distance of the body from the road surface or also from a defined satellite position above the earth surface. Other degrees of freedom of motion, such as roll and pitch relative to the corresponding object, are also possible due to the arrangement of a plurality of sensors. The definition of the position of the body according to the GPS principle is, in general, not realistic at present for the vertical dynamic regulation of the body due to the requirements imposed on accuracy and the requirement imposed in terms of availability. By contrast, vehicle-mounted optoelectronic sensor systems are complicated and can therefore be used mainly for technical measuring tasks.

By relative measurement, i.e., by means of a sensor system, which is arranged in the area of the wheel suspension and/or the body and which determines the relative position between the transducer element and a sensor according to a magnetic or electrical principle of operation. The transducer and sensor are arranged at components of the wheel suspension and/or of the body, which components have variable positions in relation to one another. Since reproducible changes in position occur between these components during, for example, inward deflection motions of the wheel suspension, which changes in position can be considered to be proportional to the inward deflection path, the measured value of the sensor is used now for the determination of these variables by measurement. Possible principles are magnetoresistive sensors as well as Hall sensors, inductive or ohmic sensors.

By acceleration measurement, i.e., by means of seismically sensitive sensor systems, which represent an output signal proportional to the acceleration of the pick-up. The acceleration is an absolute variable in relation to a stationary inertial system, for example, the center of the earth. The absolute velocity can be determined by simple time integration, and the absolute position can be determined by repeated integration. Especially the latter is usually possible, due to the error of the sensor signal, with a great effort only by the use of special filtering techniques. In principle, the detection of great, high-frequency accelerations can be represented more easily than that of lower-frequency motions due to the small seismic mass of the sensor. If a plurality of sensors are used on different components, it is also possible to calculate the relative acceleration and the relative velocity between the components in a defined direction. Due to its principle of operation, the sensor itself is highly sensitive to stationary and dynamic changes in its axial position; however, this directional dependence of the sensor in relation to the field of gravity of the earth can also be used to determine angular positions in space in case of a corresponding arrangement and analysis algorithm.

The above-described principles can be used for the determination of the primary states of motion of motor vehicles and for the determination of the corresponding states in passive and/or active chassis power elements.

EP 1 424 225 A2 discloses, for example, a bearing for a control arm of a wheel suspension of a vehicle, in which the bearing has at least one sensor, which is arranged in and on the bearing, and which determines the relative motion of the vehicle parts connected to one another by the bearing. This bearing can be used, in particular, to measure the level of the vehicle.

DE 103 33 997 A1 discloses a sensor array for a land vehicle with a body and at least one wheel, wherein the sensor array comprises a level sensor for measuring the relative position of the at least one wheel in relation to the body. The level sensor has electronic components, which are arranged in a housing, in which at least one acceleration sensor is provided. Furthermore, a land vehicle with a body and four wheels is disclosed, wherein one such sensor array each is provided between at least three of the wheels and the body.

A process for controlling the intensity of damping of an adjustable damper in a motor vehicle is known from U.S. Pat. No. 6,847,874 B2, in which the distance between a wheel and the vehicle body of the motor vehicle is measured with the use of distance sensors and a difference is formed from the distance sensor signals sent by these sensors. Damper velocity signals are determined from the difference of the distance sensor signals over a fixed time difference, and the damper velocity is determined from this. The damping intensity is controlled as a function of the damping velocity. A high-pass filter is used to filter out low frequencies below 2 Hz from the distance signals. Furthermore, the distance sensor signals are filtered by a low-pass filter, whose output signals are used to calculate the damper velocity signals. Already available sensors of a level control or of an air spring may be used as sensors, and the damper velocity is preferably determined for each wheel. The velocity of the vehicle body can be detected by means of an acceleration sensor mounted on same. As an alternative, the velocity of the vehicle body is determined from a damper velocity signal with the wheel velocity component filtered out.

However, the use of a body-side acceleration sensor combined with chassis-side distance sensors leads to an increased design effort and relatively high costs. Furthermore, the alternative determination of the velocity of the vehicle body from a damper velocity signal with the wheel velocity component filtered out is inaccurate.

SUMMARY OF THE INVENTION

An object of the present invention is to determine at least one state of motion of the vehicle body with high accuracy with the use of a path or angle sensor and an acceleration sensor, while the design effort, especially the space needed for the installation of the sensor system, can be reduced. The knowledge of this state of motion can then be used to better control the suspension of the vehicle.

The process according to the present invention for determining at least one state of motion of a vehicle body of a vehicle, especially of a motor vehicle, which has at least one (first) wheel spring-mounted on the vehicle body via a (first) wheel suspension, comprises the process steps:

measurement of an inward deflection of the wheel by means of a (first) path or angle sensor, determination of a velocity of inward deflection of the wheel by differentiation of the inward deflection of the wheel over time, measurement of a vertical acceleration of the wheel by means of a (first) acceleration sensor, determination of a vertical velocity of the wheel by integrating the vertical acceleration of the wheel over time, and calculation of a (first) vertical velocity of the vehicle body by forming the difference of the vertical velocity of the wheel and the velocity of inward deflection of the wheel.

A vertical velocity of the vehicle body is determined in the process according to the present invention as the (first) state of motion of the vehicle body, and it is possible to provide both the acceleration sensor and the path or angle sensor in the wheel suspension and/or at the wheel. In particular, it is no longer necessary to fasten the acceleration sensor to the vehicle body. Thus, both sensors can be arranged in close proximity to one another in space in the wheel suspension, as a result of which the design effort or the space needed for installation can be reduced.

The term "inward deflection" is defined especially as the vertical distance between the particular wheel and the vehicle body. Furthermore, the term "vertical" shall be defined such that the vertical direction extends in parallel to the vertical axis of the vehicle or coincides with same. In particular, the difference formation is carried out such that the velocity of inward deflection of the wheel is subtracted from the vertical velocity of the wheel. The inward direction can also be considered to be the suspension travel direction of the wheel as the suspension allows the wheel to move in response to changing road conditions.

The vehicle preferably has at least one second wheel spring-mounted on the vehicle body via a second wheel suspension, wherein the two wheels are part of a common vehicle axle, the inward deflection of the second wheel is measured by means of a second path or angle sensor, a velocity of inward deflection of the second wheel is determined by differentiating over time the inward deflection of the second wheel, a vertical acceleration of the second wheel is measured by means of a second acceleration sensor, a vertical acceleration of the second wheel is determined by integrating over time the vertical acceleration of the second wheel, and a second vertical velocity of the vehicle body is calculated by forming a difference from the vertical velocity of the second wheel and the velocity of inward deflection of the second wheel.

According to this variant, a second vertical velocity of the vehicle body is calculated as the second state of motion of the vehicle body, the difference formation being carried out especially by subtracting the velocity of inward deflection of the second wheel from the vertical velocity of the second wheel.

Since the vertical velocities of the vehicle body with respect to both wheels of one vehicle axle are available, it is also possible to determine the roll velocity of the vehicle body. To do so, the difference between the two vertical velocities of the vehicle body is formed and subsequently divided preferably by a reference dimension, which is given, for example, by the track width of the axle or by the distance between the two sensors. The roll velocity forms a third state of motion of the vehicle body. This provides more information for controlling the suspension of the vehicle, in that undesired roll can be compensated for.

The vehicle has especially at least one third wheel, which is spring-mounted on the vehicle body and is part of a second vehicle axle. The vertical acceleration of the third wheel can be measured by means of a third acceleration sensor. However, the vertical acceleration of the third wheel is determined preferably by at least one of the measured vertical accelerations of one of the other wheels being delayed in time, because it was found that an excitation of one of the front wheels, induced by the road surface (road), regularly occurs with a time delay on a rear wheel of the same side in conventional vehicles beginning from a certain velocity during operation on the road. The velocity of the vehicle can be measured with a sensor and the duration of the time delay can be determined as a function of the measured velocity. Furthermore, the front axle and the rear axle preferably have the same or nearly the same track width.

With the process step of time delay, for example, with the use of a shift function, it is possible to eliminate the need for a vertical acceleration measurement for the third wheel and hence also an acceleration sensor for the third wheel. A similar statement can also be made with respect to a fourth wheel, if present, which is part of the common second vehicle axle together with the third wheel. However, it is also possible to carry out the measurements, calculations and determinations performed for the first wheel or the process steps carried out in connection with the first wheel for the third and/or fourth wheel of the vehicle as well.

The vehicle body can be considered to be a plane in a simplified manner, and the position of a plane in space can be defined by three points. An inward deflection of the third wheel is therefore preferably measured by means of a third path or angle sensor, and a velocity of inward deflection of the third wheel is determined by differentiating the inward deflection of the third wheel over time. The vertical acceleration determined for the third wheel can be integrated over time for determining a vertical velocity of the third wheel, the vertical acceleration of the third wheel being obtained either by measurement with a third acceleration sensor or by a time delay of the acceleration signal determined, for example, with the first and/or second acceleration sensor. A third vertical velocity of the vehicle body can now be calculated as a third state of motion by forming the difference between the vertical velocity of the third wheel and the velocity of inward deflection of the third wheel, the difference formation being carried out especially such that the velocity of inward deflection of the third wheel is subtracted from the vertical velocity of the third wheel. Thus, three vertical velocities of the vehicle body are available for describing the state of motion of the vehicle body.

In addition, it is possible to perform an inward deflection measurement and a determination of the vertical acceleration for the fourth wheel as well in order to analogously obtain a fourth vertical velocity of the vehicle body.

Each of the vertical velocities of the vehicle body is preferably assigned to a corner of the vehicle body, and the corners can be characterized by an intersection each, which is formed by a straight line (vertical axis) with the vehicle body, which straight line extends in the vertical axis of the vehicle in the direction of the vehicle body. Furthermore, a vehicle spring for each wheel can be assumed to be a spring lying on the respective vertical axis. However, regardless of this hypothesis, the actual position of the vehicle spring may also deviate from this vertical axis for each wheel.

The signals measured by the sensors may have, in particular, signal components that interfere with the determination of the state of motion or states of motion of the vehicle body in both the high frequency range and the low frequency range. The signals obtained by means of the sensors are therefore subject to filtering, especially band pass filtering, preferably before the differentiation over time and/or before the integration over time, so that the interfering signal components are filtered out.

The present invention pertains, furthermore, to a vehicle, especially a motor vehicle, with a vehicle body, at least one (first) wheel, which is spring-mounted on the vehicle body via a (first) wheel suspension, at least one (first) acceleration sensor, and at least one (first) path or angle sensor, which is arranged in the wheel suspension and by which or by means of which the inward deflection of the wheel can be detected, and a differentiator arranged downstream of the path or angle sensor, wherein the acceleration sensor is arranged at the wheel or in the wheel suspension, the acceleration sensor is followed downstream by an integrator, and wherein a subtractor is arranged downstream of the integrator and the differentiator.

Both the acceleration sensor and the path or angle sensor are provided in the vehicle according to the present invention in the wheel suspension and/or at the wheel or wheel carrier, so that the two sensors can be arranged in close proximity to one another in space. The acceleration sensor is located, in particular, at a spaced location from the vehicle body and is fastened, for example, to the wheel carrier. The acceleration sensor together with the path or angle sensor is preferably arranged or integrated in a common housing or joint (for example, ball and socket joint), so that an especially compact and space-saving sensor array can be obtained. The housing or joint may be fastened to the wheel carrier or to a control arm. The joint is used, for example, to connect the wheel carrier to the control arm, via which the wheel carrier or the wheel is articulated to the vehicle body. The integration in space of the acceleration sensor and the path or angle sensor can thus also be called a sensor cluster and is preferably equipped with an electronic signal processing of its own and a common electronic signal interface. In particular, the sensor cluster forms a module with a common signal processing or analysis means, which may have, among other things, a temperature compensation, a memory, a characteristic diagram for linearization, a digital computer and/or a possibility of self-diagnosis. The module may comprise the housing and/or form the joint and is preferably replaceable as an integral unit.

The path or angle sensor can send a signal characterizing the inward deflection of the wheel, which signal is converted into a signal characterizing the velocity of inward deflection of the wheel. Furthermore, the acceleration sensor can send a signal characterizing the vertical acceleration of the wheel, which signal is converted into a signal characterizing the vertical velocity of the wheel. The two velocity signals can be subtracted from one another by the subtractor, and, in particular, the signal obtained by means of the differentiator can be subtracted from the signal obtained from the integrator. In addition, a filter each, which filters out interfering signal components and is designed especially as a band pass filter, may be arranged between the acceleration sensor and the integrator and/or between the path or angle sensor and the differentiator.

The array of a path or angle sensor with a downstream differentiator and of an acceleration sensor with a downstream integrator, wherein the integrator and the differentiator are followed downstream by a common subtractor, may be provided as a multiple array, in which case each of these arrays may be associated with one wheel each, which is spring-mounted on the vehicle body via a wheel suspension belonging to it.

The present invention pertains, furthermore, to the use of the vehicle according to the present invention for carrying out the process according to the present invention.

By suitably arranging sensor systems arranged on the chassis only (for example, path or angle sensor, acceleration sensor) combined with a downstream signal processing (for example, differentiator, integrator, subtractor, optionally filter), it is also possible to determine the absolute states of motion (for example, vertical velocities, roll velocities, etc.) of the body with a high accuracy in the vehicle. A body-mounted sensor system can be eliminated. The data basis detected by the sensors may form a basis for vertical, dynamically acting chassis control systems, e.g., for a semi-active damper regulation or for roll stabilization with active stabilizers.

The relevant reference variables can be shown based on the example of a two-weight oscillation model (so-called quarter vehicle), which forms a simplified linear equivalent to the vertical degree of freedom of the oscillation system. The weight of the body and the weight of the wheel—this corresponds especially to the weight of the wheel, tire, wheel carrier and optionally brake including a proportionate weight of the wheel guide components and drive components connected to the wheel carrier—are connected to one another via spring elements and damping elements. The wheel itself is likewise spring-supported in relation to the road surface and is excited by same vertically.

A time curve of the following motion variables is obtained, for example, when driving over a usual uneven road surface:

$z_{body}$: absolute vertical path of the vehicle body $z_{wheel}$: absolute vertical path of the wheel $z_{rel}$: relative vertical path of the wheel in relation to the body $z_{road}$: foot position of excitation, e.g., defined by the road surface.

The simple or double time derivation of these variables yields the corresponding vertical velocities and vertical accelerations, respectively. The sensor system used for detecting the states of motion of the wheel and body has acceleration sensors and relative path sensors. To determine from these vertical velocities, which are desired as input variables for a damping regulation, the acceleration signals $\ddot{z}_{wheel}$ are integrated over time and filtered, whereas the relative signals $z_{rel}$ are differentiated over time and filtered. The goal of this process is to determine the vertical velocity of the body. Acceleration sensor systems arranged on the body can be eliminated. Acceleration pick-ups are used, instead, at the wheel combined with relative path sensors, which measure the distance between the wheel and the body.

The measured signals $z_{rel}$ and $\ddot{z}_{wheel}$ are processed numerically for each corner of the vehicle by means of the calculation chain arranged downstream of the sensors.

The acceleration signal is subjected to band pass filtration, partly to suppress higher-frequency noise components but also motion components in frequency spectra, which should not appreciably affect the body regulation and do not affect, in general, the position of the body based on the spring-damper coupling of the wheel weight and the body weight, and partly to compensate stationary components of the signal (offsets, slow oscillations), which would lead to a signal drift during the subsequent time integration. The integrated, band pass-filtered output variable forms an equivalent to the absolute vertical velocity of the wheel.

The signal of the relative path sensor is preferably likewise subjected to band pass filtration. The high-pass component of this filter is used, however, predominantly with the goal of adapting the dynamic transmission properties of filtration to the acceleration signal filtration. The phase differences shall be kept very small by a corresponding coordination of the respective signal filter properties, because run time errors can otherwise develop during the later summation of the signals. Thus, the filter is used especially as a phase correction element (the phase develops already because a differentiator and an integrator have contrary phase curves). The signal is subsequently preferably differentiated numerically.

Since the two calculation loops, i.e., the integration and the differentiations, have markedly different dynamic transmission characteristics, but the goal of the process described is the most accurate determination possible of the body dynamics in a defined frequency spectrum in respect to the phase and amplitude characteristics, the filter components can be suitably adapted to one another in order to avoid calculation errors.

By subtracting the two output variables from the filtration, the vertical velocity of the body is now obtained on the basis of the following calculation rule (under the assumption of a positive sign for $z_{rel}$ in the direction of inward deflection):

$$\dot{z}_{body} = \int_0^{T_{vehicle}} \ddot{z}_{wheel\_filt} dt - \frac{d}{dt} z_{rel\_filt}$$

The physical integration in space of the acceleration and path sensor is expressly possible and desirable. An intelligent angle joint can thus ideally integrate a vertical acceleration pick-up for detecting the level. The necessary sensor system is thus assigned to the system domain chassis.

The state variable $\dot{z}_{body}$ shall be able to be used for regulating further degrees of freedom of motion $\phi_{body}$ and $\Theta_{body}$ of the chassis, where the roll velocity of the vehicle body is designated by $\phi_{body}$ and the pitch velocity of the vehicle body by $\Theta_{body}$. Referencing of the vertical dynamic state variables measured and calculated at all four corners can be performed for this by calculation. For example, the roll velocity $\phi_{body}$ of the body is calculated from the difference of the vertical velocities $\dot{z}_{body\_FL}$ and $\dot{z}_{body\_FR}$ of the vehicle body, which were determined for the two corners or sides of one axle (here the front axle), and this difference is to be divided by a reference dimension $S_{FA}$, which spans over the respective wheel at right angles between the vertical corner axes used for the calculation and measurement of the vertical dynamic motion variables. The calculation of the pitch velocity can be carried out analogously hereto.

An optimal substitution of individual sensor systems can be embodied, for example, by referring the vertical acceleration measured at the front wheel with a phase shift to the rear wheel by means of a delay function (shift function) $f(\Delta t)$, which takes into account the current velocity of travel $v_{x\_vehicle}$ as well as the wheelbase 1 of the vehicle, in which $$\Delta t = \frac{l}{v_{x\_vehicle}}$$

The prerequisite for the functioning of this procedure with sufficient accuracy is that the rear wheel rolls with a time delay over the identical excitation profile (road surface) compared to the front wheel and performs an identical vertical motion. This prerequisite is typically satisfied during travel on the road in case of an extensively similar track width and wheel weight starting from a minimum velocity. The process substitutes two acceleration pick-ups on the rear axle. The shift function can be extrapolated to the displacement transducer only conditionally, because the pitch dynamics of the body causes relative path differences between the front axle and the rear axle, so that at least one path signal should be measured on the rear axle according to the principle of the flat plate.

According to the principle of the corresponding motion of the plate, the relative position of the upper plate (vehicle body) in relation to the lower plate (plane of the wheel carriers) is sufficiently defined by the signals of three relative path transducers, i.e., the relative roll angle, the relative pitch angle and the relative vertical distance as well as the time derivatives thereof can be determined in case of known plate geometry, which is defined by the sensor positions.

The use of a model-based imaging of the lower plane by a plate defined by the wheel carriers, whose position adapts itself steadily to the road surface but remains flat, is valid on usual road surfaces and has proved successful as an approximate process. The state of motion of the corners of these lower plates is sufficiently defined by the wheel acceleration sensor system and the shift function, so that the velocity variables can also be determined by the simple time integration, and the position state variables of this plate can also be determined in case of double integration, with a correspondingly reduced accuracy.

Especially the following advantages can be achieved with the process according to the present invention, the vehicle according to the present invention, and/or the use according to the present invention:

elimination of the need for body-mounted sensor systems for determining motion variables of the body, the use of sensor systems arranged exclusively in the chassis or in the wheel suspension for determining motion variables of the body (the determination of the relative path belongs entirely to the system domain chassis in terms of space of physical arrangement if suitable sensor systems are used; in particular, there is no interface to the body), the looping of the dynamics of the particular calculation chain in the calculation of the state variables of the body in a defined frequency range by means of a filter circuit.

Furthermore, the present invention has advantages in the substitution of sensor systems, in the possible integration in space of the sensor systems (clustering), as a result of which a reduction to three sensor clusters is possible (in case of integration of local intelligence in a master sensor and the build-up of a communication chain, passing on of a qualified data base for a plurality of regulation systems is conceivable; the clustering could comprise: the rpm of the wheel, the vertical acceleration of the wheel and the path of inward deflection), and in the possible maximum utilization of regulation system functions due to high accuracy in the determination of the relative path, e.g., of the damper, so that position-dependent regulation strategies can be represented.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
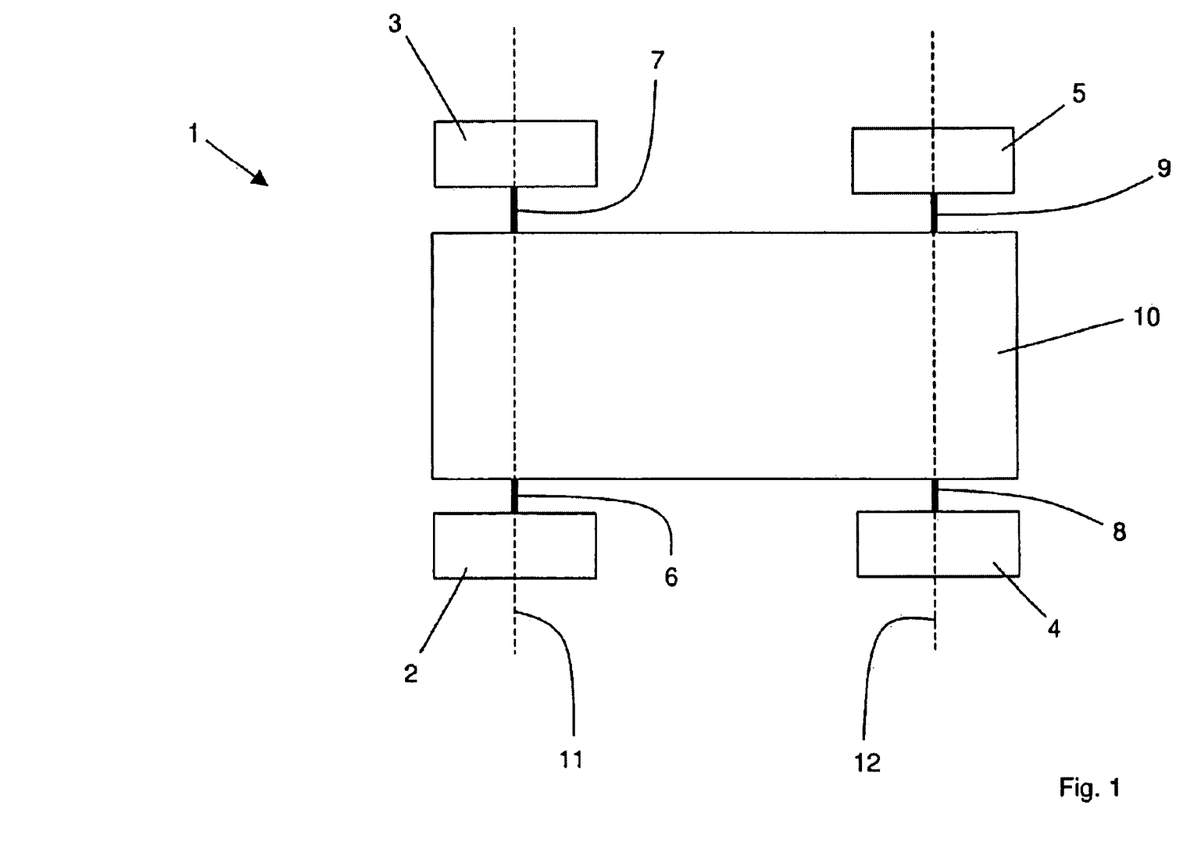
FIG. 1 is a schematic top view of a vehicle according to an embodiment of the present invention.

Referring to the drawings in particular, FIG. 1 shows a schematic top view of a vehicle 1 according to an embodiment of the present invention, in which four wheels 2, 3, 4 and 5 are connected to a vehicle body 10 via a wheel suspension 6, 7, 8 and 9 each. The two wheels 2 and 3 are part of a front axle (FA) 11 and the two wheels 4 and 5 are part of a rear axle (RA) 12.

Figure 2:
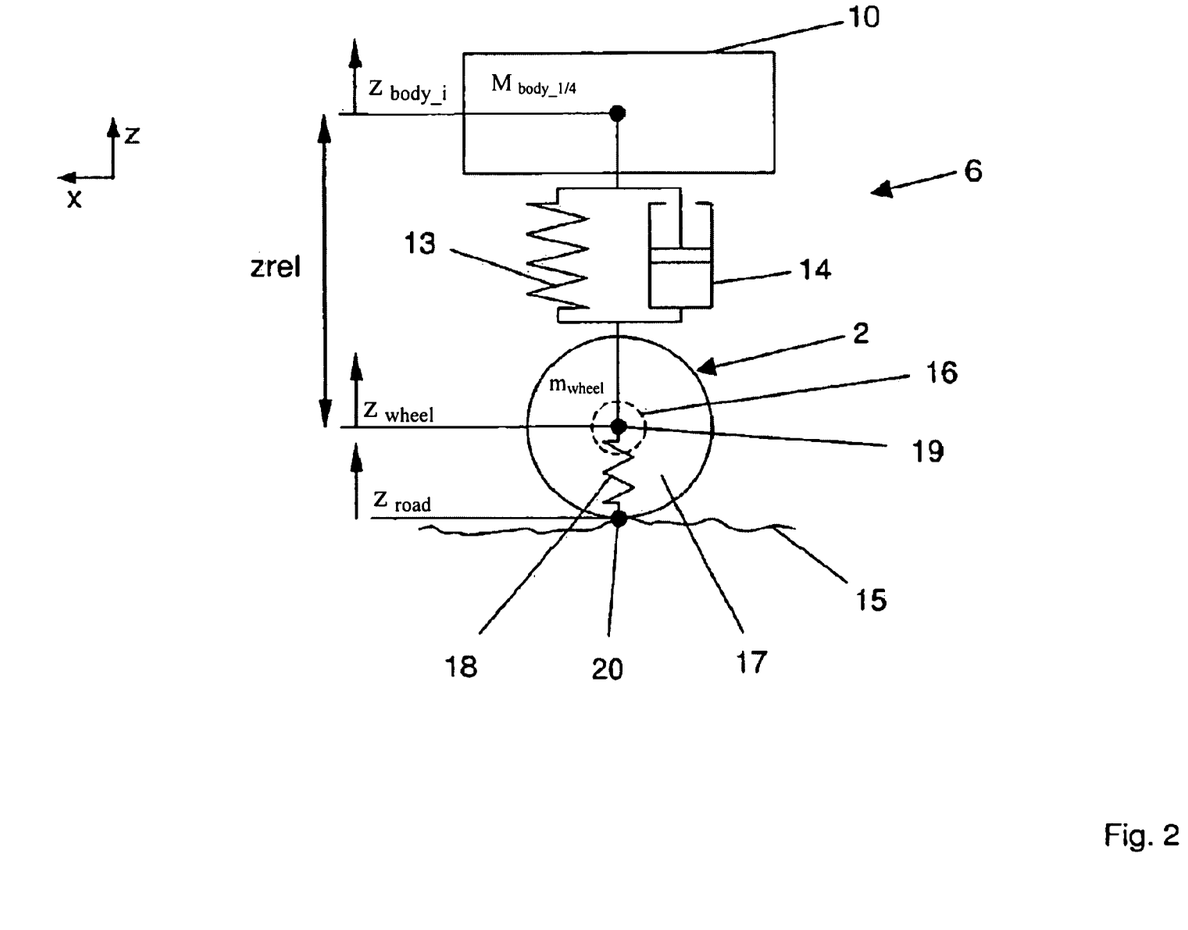
FIG. 2 is a schematic view of a wheel suspension according to FIG. 1.

FIG. 2 shows a schematic view of the wheel suspension 6, in which wheel 2 is connected to the vehicle body 10 via a vehicle spring 13 and via a shock absorber 14. Wheel 2 is in contact with a pavement or road surface 15 with a tire 17 and has a wheel carrier 16 connected to the spring 13 and to the shock absorber 14. The tire 17, which is preferably filled with air, forms a spring 18, which acts and is arranged between the road surface 15 and the wheel carrier 16. Wheel 2 is in contact with the road surface 15 via a wheel contact point 20 and has a central axis or axis of rotation 19.

Furthermore, the absolute vertical path, or position, of the vehicle body $z_{body\_i}$, the absolute vertical path/position of the wheel $z_{wheel}$, the relative vertical path/position in relation to the body, $z_{rel}$, as well as the foot position of the excitation $z_{road}$ are seen, wherein $z_{rel}$ is also called the inward deflection. The z axis of the system of coordinates shown in FIG. 2 represents the vertical axis of the vehicle, whereas the x axis denotes the direction of travel or the longitudinal axis of the vehicle 1. The letter "z" and the term "vertical" thus designate a direction that extends in parallel to the vertical axis of the vehicle or coincides with same.

The arrangement shown in FIG. 2 represents a two-weight equivalent model for vertical accelerations of the vehicle, wherein $m_{wheel}$ designates the weight, or mass, of the wheel and $m_{body\_1/4}$ designates the part of the weight, or mass, of the vehicle body $m_{body}$, which acts on the wheel suspension 6 and equals especially one quarter thereof.

Even though FIG. 2 shows only the wheel suspension 6 for wheel 2, the other wheels 3, 4 and 5 are also connected to the vehicle body 10 via corresponding wheel suspensions 7, 8 and 9. This is also reflected by the use of the subscript "i" in the designation $z_{body\_i}$, which represents FR (=wheel suspension 7 or front right), FL (=wheel suspension 6 or front left), RR (=wheel suspension 9 or rear right) or RL (=wheel suspension 8 or rear left). Since the wheel suspension 6 is concretely shown in FIG. 2, the subscript i could also be taken to be equal to FL here. As an alternative, it is, of course, possible to have the subscript i range from 1 to 4, for example, with FR=1, FL=2, RR=3 and RL=4.

Figure 3:
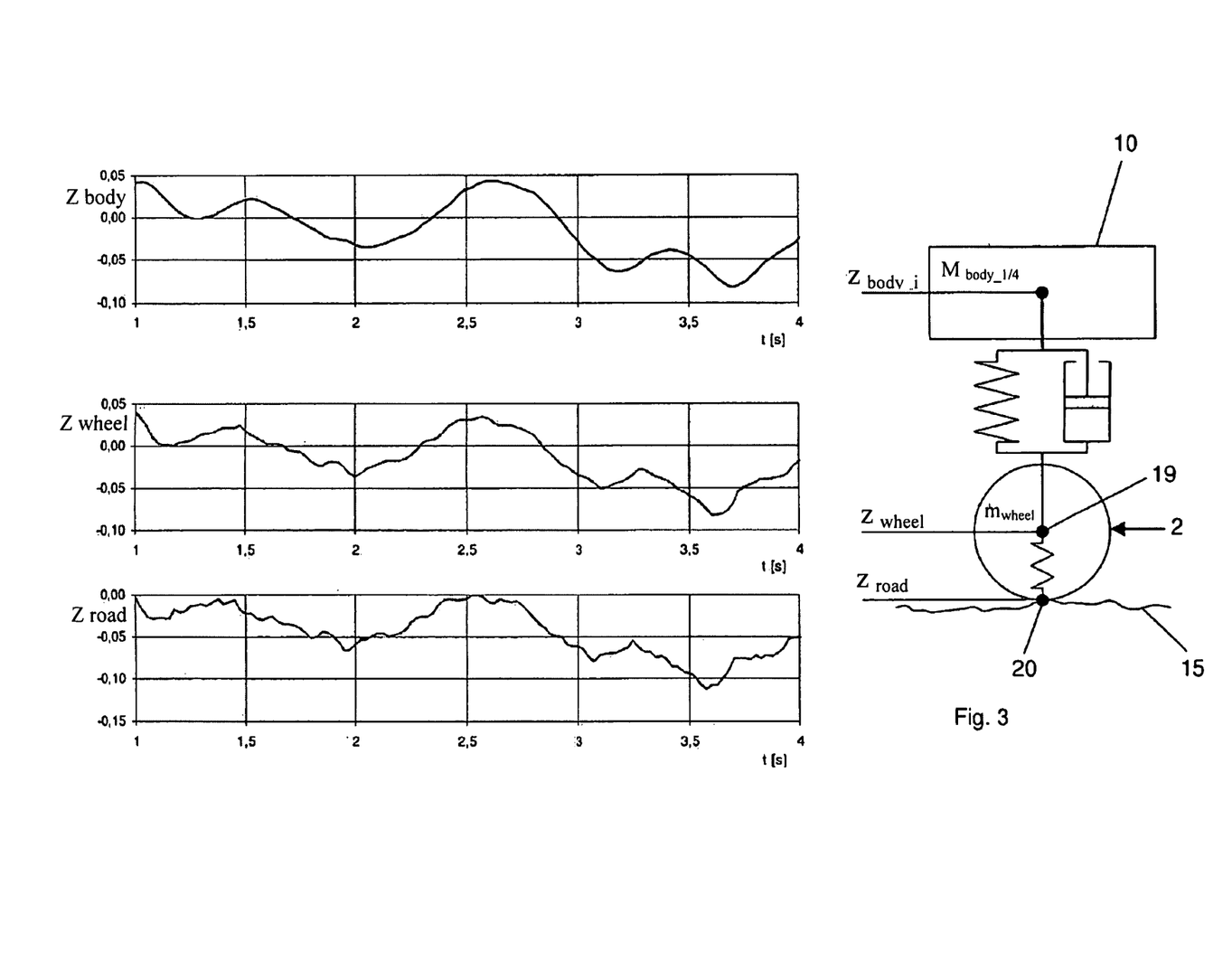
FIG. 3 is a curve of absolute vertical dynamic motion variables of the vehicle during travel over an uneven road surface.

FIG. 3 shows the vertical path $z_{body}$ of the vehicle body 10 and the vertical path $z_{wheel}$ of wheel 2 for a predetermined excitation $z_{road}$, wherein $z_{body}$, $z_{wheel}$ and $z_{road}$ are plotted over time. The excitation $z_{road}$ caused by the road surface 15 acts on the wheel 2 and on the tire spring 18 at the wheel contact point 20. Thus, FIG. 3 shows an example of the dependence of the position $z_{wheel}$ of wheel 2 and the position $z_{body}$ of the vehicle body 10 on the excitation $z_{road}$.

Figure 4:
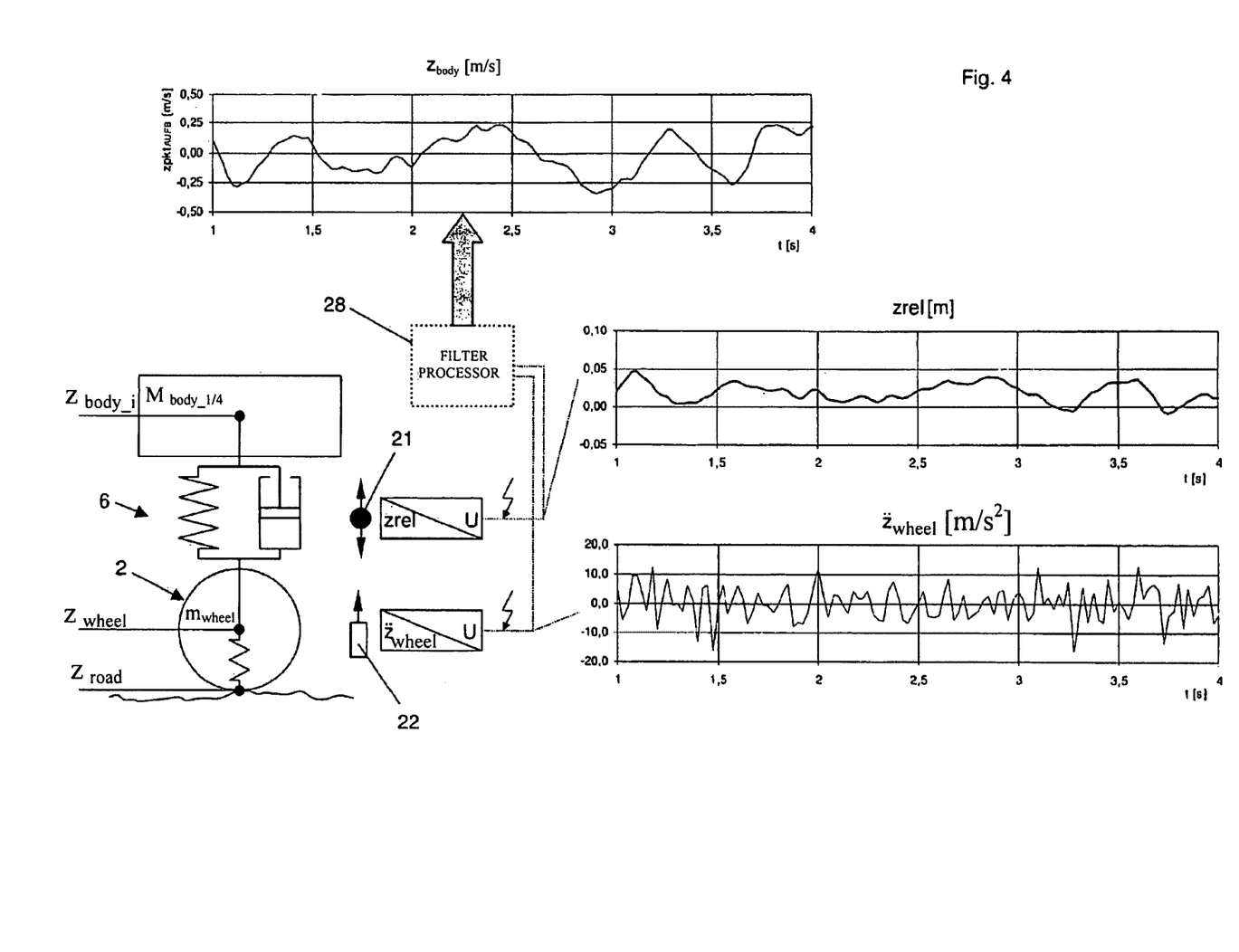
FIG. 4 is an illustration of the determination of a vertical velocity of the vehicle body.

According to FIG. 4, an inward deflection sensor 21, by which a signal characterizing the inward deflection $z_{rel}$ of wheel 2 is sent, is arranged in wheel suspension 6. Sensor 21 may be designed as a path/position sensor or as an angle sensor here. The latter is provided, for example, in a joint, especially in a ball and socket joint, via which the wheel suspension 16 is connected to the vehicle body 10 via the intermediary of a control arm. Sensor 21 or the joint may be provided on the control arm on the wheel carrier side or on the vehicle body side. However, the inward deflection sensor 21 is arranged especially at wheel 2 or at the wheel carrier 16.

Furthermore, an acceleration sensor 22, by which the vertical acceleration $\ddot{z}_{wheel}$ of wheel 2 or a signal characterizing same is sent, is arranged at wheel 2 or at the wheel carrier 16. A vertical velocity $\dot{z}_{body}$ of the vehicle body 10 can now be determined by means of the signals obtained from the two sensors 21 and 22. As is apparent from FIG. 8, the signal $z_{rel}$ obtained from sensor 21 is sent for this at first to a band pass filter 23, which passes on the filtered signal $z_{rel\_Filt}$ to a differentiator 24. Furthermore, the output signal $\ddot{z}_{wheel}$ of the acceleration sensor 22 is sent to a band pass filter 25, from which the filtered signal $\ddot{z}_{wheel\_Filt}$ is passed on to an integrator 26. The output signal $\dot{z}_{rel\_Filt}$ of differentiator 24 and the output signal $\dot{z}_{wheel\_Filt}$ of integrator 26 are now sent to a subtractor 27, which subtracts $\dot{z}_{rel\_Filt}$ from $\dot{z}_{wheel\_Filt}$. The difference $\dot{z}_{wheel\_Filt} - \dot{z}_{rel\_Filt}$ will then correspond to the vertical velocity $\dot{z}_{body}$ of the vehicle body 10 (with respect to the wheel suspension 6) and is sent by the subtractor 27 as an output signal.

Figure 8:
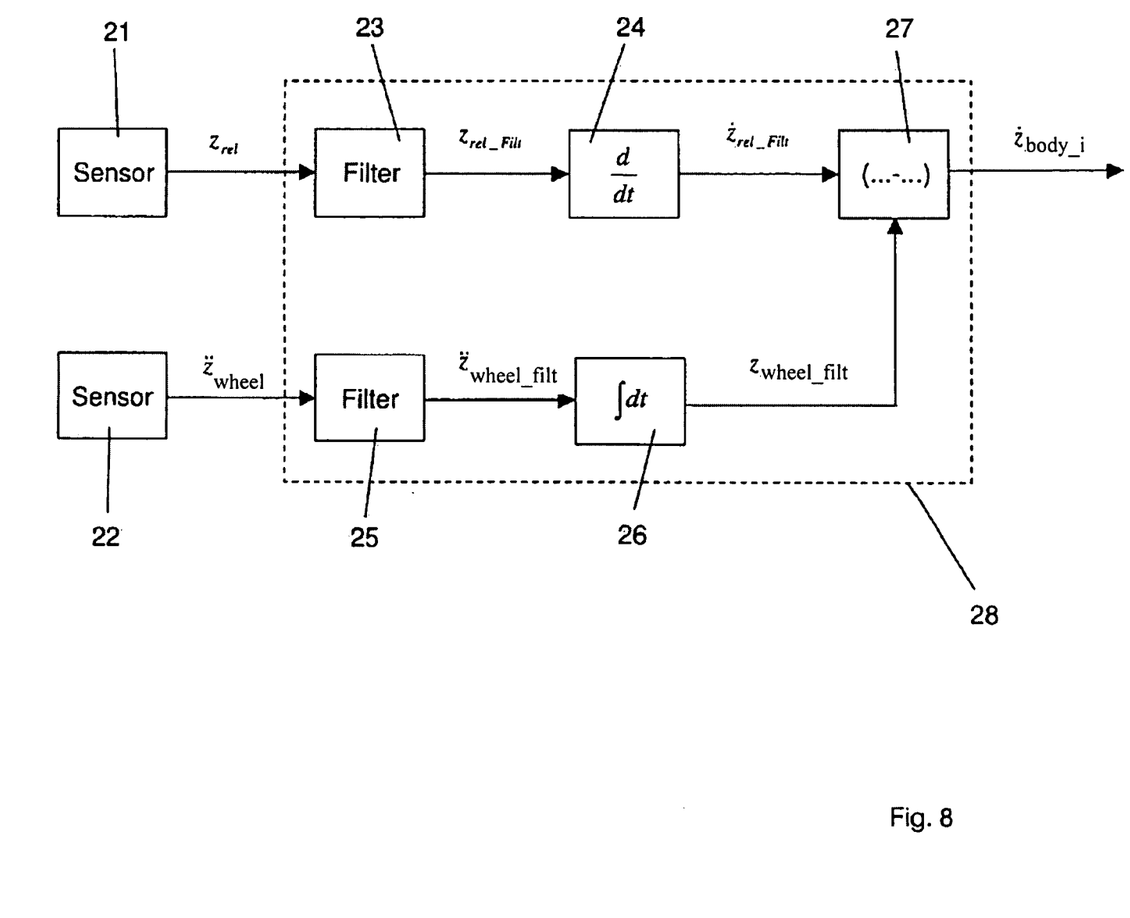
FIG. 8 is a schematic block diagram for determining a vertical acceleration of the vehicle body.

Filter 23, differentiator 24, filter 25, integrator 26 and/or subtractor 27 may be designed as analog or time-discrete electric assembly units. However, a digital computer, by which all or part of the assembly units 23 through 27 are embodied, is preferably provided. In particular, the assembly units 23 through 27 can be integrated into a common analysis means 28, which is formed preferably by a digital computer.

FIG. 4 shows two measured curves for $z_{rel}$ and $\ddot{z}_{wheel}$, which were determined by the sensors 21 and 22 on the basis of an excitation, not shown, of wheel 2. Furthermore, the vertical velocity $\dot{z}_{body}$ of the vehicle body 10, determined on the basis of the measured values $z_{rel}$ and $\ddot{z}_{wheel}$ by means of the analysis means 28, is shown as a time curve.

Figure 5:
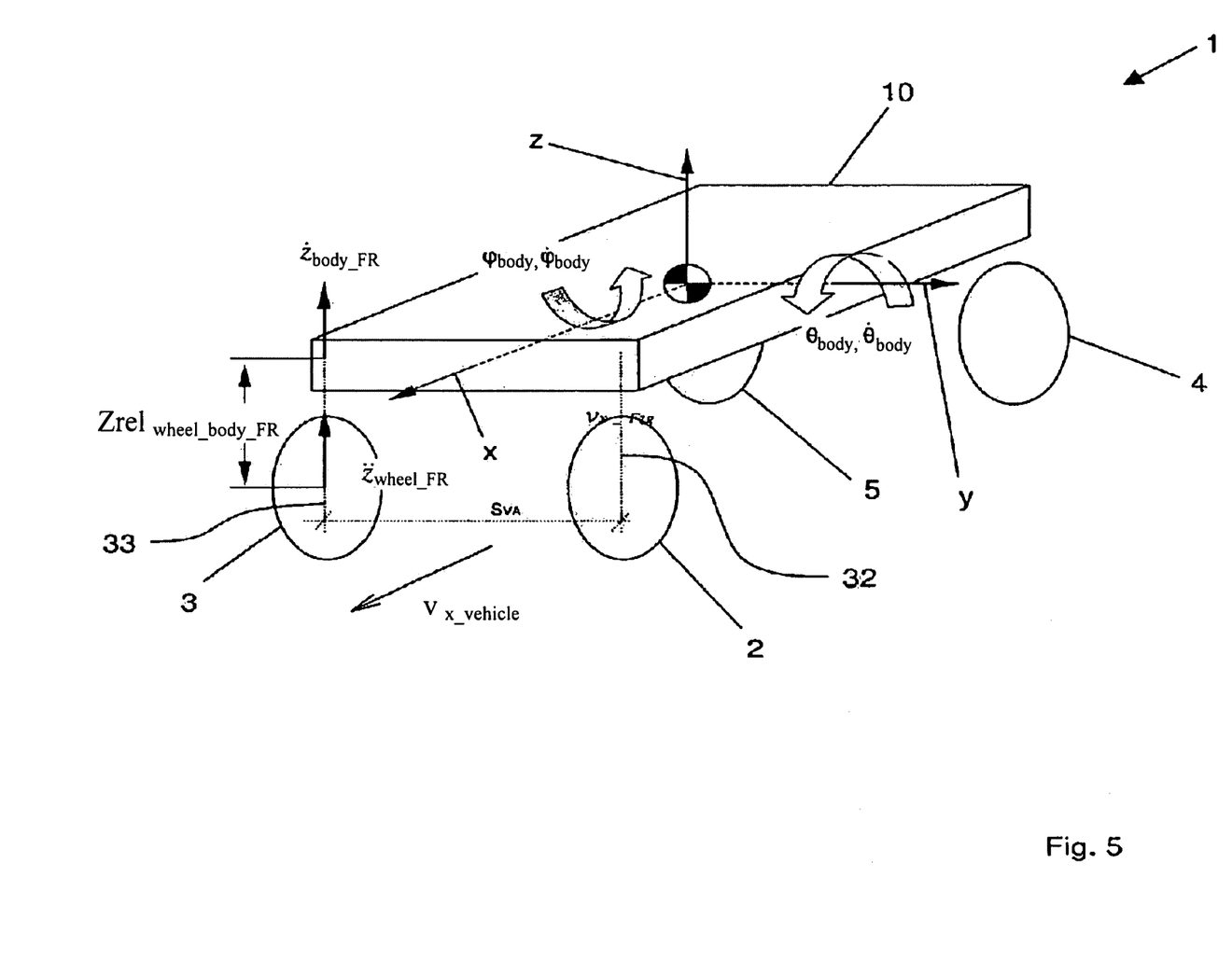
FIG. 5 is a simplified perspective view of the vehicle according to FIG. 1 with an illustration of states of motion of the vehicle body.

FIG. 5 shows a schematic perspective view of the vehicle 1, where the y axis of the system of coordinates according to FIG. 2, which axis characterizes a transverse direction of the vehicle 1, is additionally shown as well. Angle $\phi_{body}$ describes a rolling motion of the vehicle body 10 about the x axis, whereas angle $\Theta_{body}$ represents a pitching motion of the vehicle body 10 about the y axis. The variable $\dot{\phi}_{body}$ designates the roll velocity and the variable $\dot{\Theta}_{body}$ designates the pitch velocity of the vehicle body 10. If the vertical velocities $\dot{z}_{body\_i}$ of the vehicle body 10 in the area of the wheels or in the respective corners are known, the roll velocity $\dot{\phi}_{body}$ and the pitch velocity $\dot{\Theta}_{body}$ can be determined. The roll velocity $\dot{\phi}_{body}$ is obtained, for example, as:

$$\dot{\varphi} = \frac{\dot{z}_{body\_Fl} - \dot{z}_{body\_FR}}{S_{FA}}$$

in which $\dot{z}_{body\_FL}$ represents the vertical velocity of the vehicle body 10 in the area of wheel 2, $\dot{z}_{body\_FR}$ the vertical velocity of the vehicle body 10 in the area of wheel 3, and $S_{FA}$ a reference dimension, which extends at right angles between two vertical corner axes or straight lines 32 and 33 and corresponds especially to the track width of the front axle 11 or to the distance between the sensors.

Figure 6:
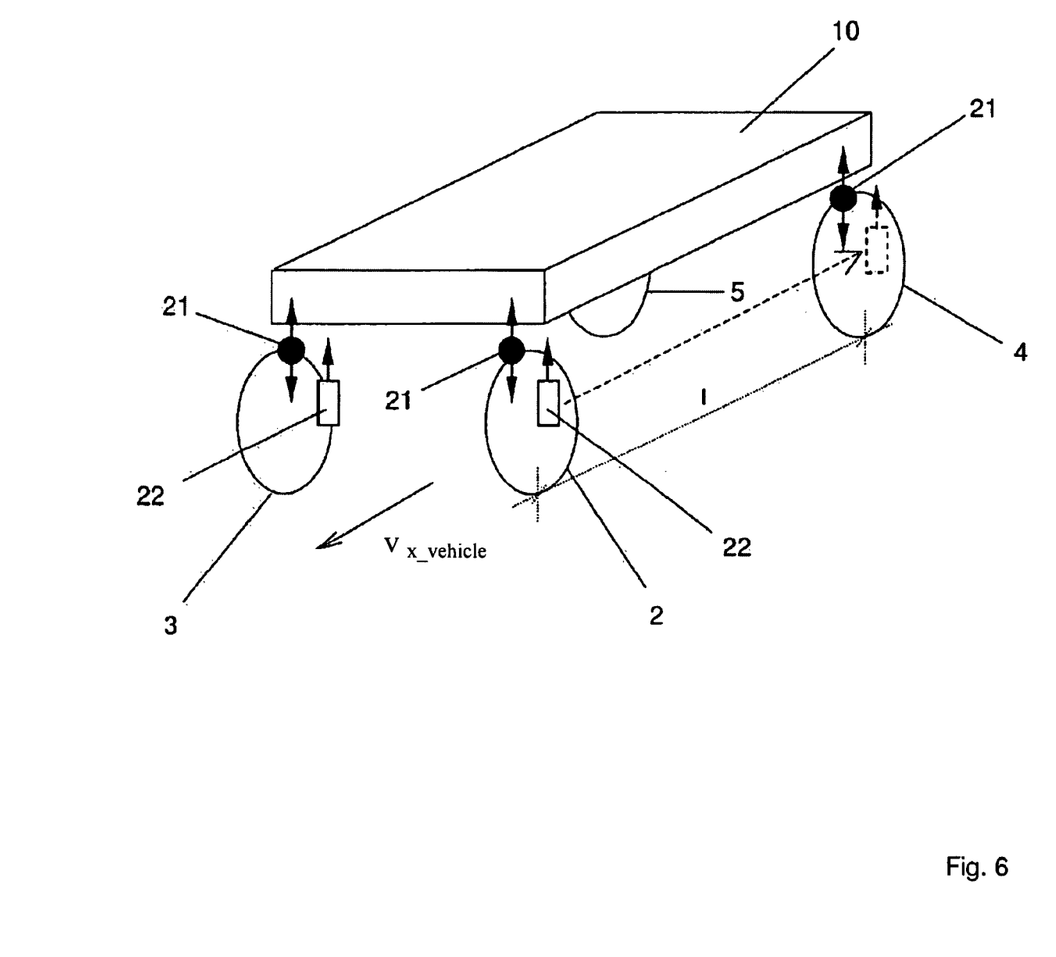
FIG. 6 is a simplified perspective view of the vehicle according to FIG. 1 with sensors.
Figure 9:
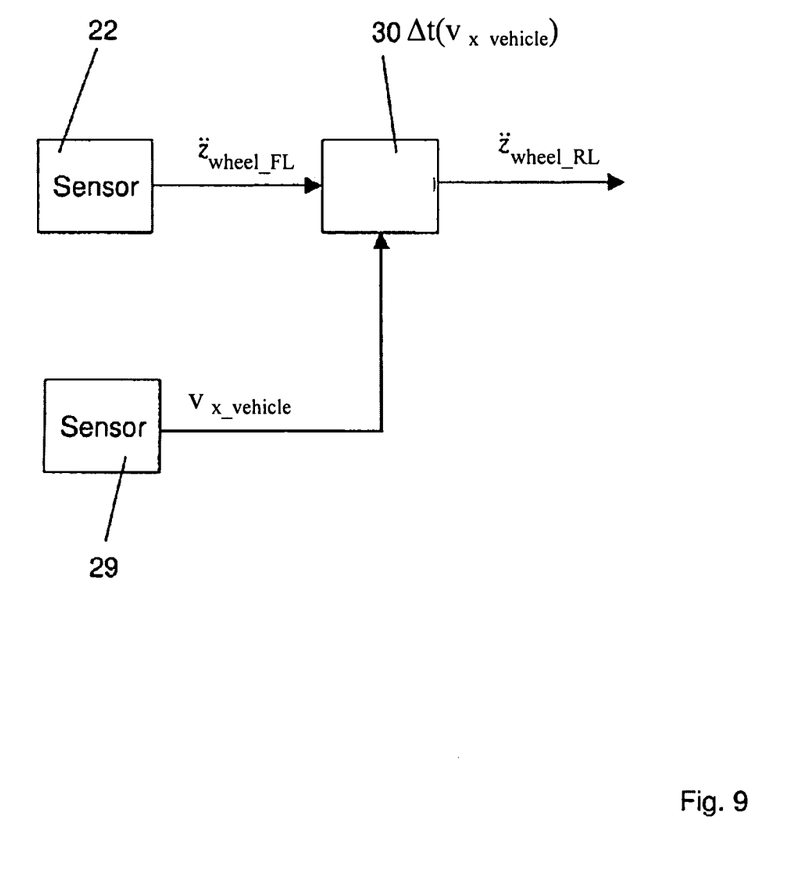
FIG. 9 is a schematic block diagram for delaying a vertical acceleration of a wheel.

According to FIG. 6, an inward deflection sensor 21 each is also provided in the wheel suspensions 7 and 8, and an acceleration sensor 22 is additionally arranged at wheel 3, so that the inward deflections of the wheels 2, 3 and 4 as well as the vertical wheel accelerations of wheels 2 and 3 of the front axle 11 can be measured. Even though the wheels 4 and 5 of the rear axle 12 have, in particular, no acceleration sensors according to FIG. 6, the vertical acceleration of the vehicle body 10 in the area of wheel 4 can nevertheless be determined by the vertical acceleration of the wheel, which is determined by the acceleration sensor 22 of wheel 2, being delayed in time. The time delay depends on the distance 1 between the front axle 11 and the rear axle 12 as well as the velocity $v_{x\_vehicle}$ of the vehicle 1, which is oriented in direction x and is detected, as is apparent from FIG. 9, by means of a velocity sensor 29. The vertical acceleration $\ddot{z}_{wheel\_VL}$ determined by the acceleration sensor 22 at wheel 2 is sent to the delay member 30, which is connected to the velocity sensor 29 and delays the signal $\ddot{z}_{wheel\_VL}$ in time by $\Delta t$. The signal sent by the delay member 30 represents here, at least approximately, the vertical acceleration $\ddot{z}_{wheel\_HL}$ of wheel 4, and the delay member 30 may be part of the analysis means 28, and it is formed, in particular, by the digital computer.

It is approximately assumed in the arrangement shown in FIG. 6 that the vehicle 1 is moving in direction x above a predetermined minimum velocity on a road and that the front axle and the rear axle have equal or essentially equal track widths, so that a vertical motion of one of the front wheels caused by the road surface also occurs on the rear wheel of the same side of the vehicle with a time delay. However, it is also possible, as an alternative, to provide the rear wheel 4 with a separate acceleration sensor, which is indicated by broken line in FIG. 6.

Figure 7:
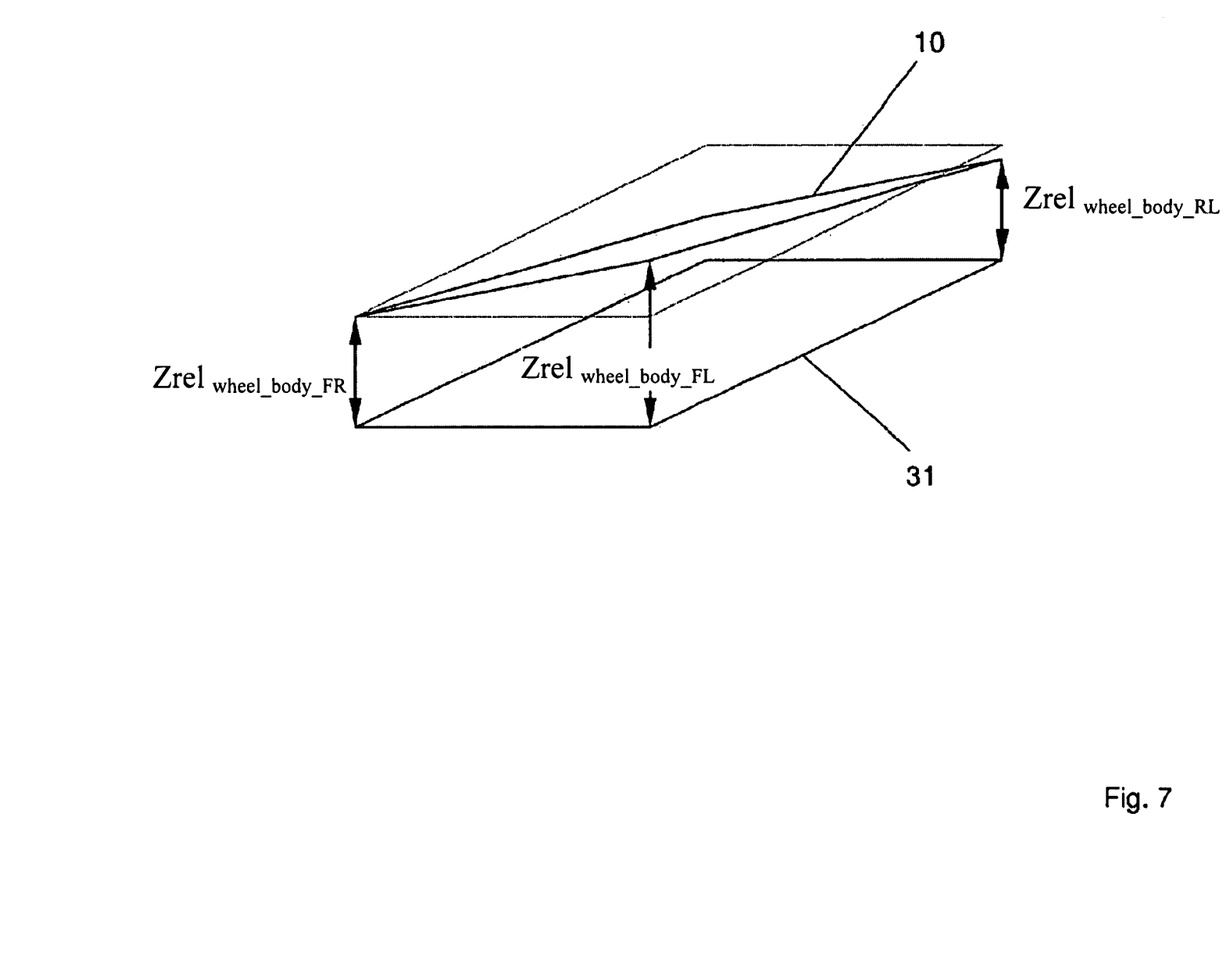
FIG. 7 is a simplified perspective view of the vehicle body according to FIG. 1.

FIG. 7 shows a schematic view of the vehicle body 10, which has a non-parallel orientation to the plane 31 of the wheel carriers of the wheels. It becomes clear, in particular, that it is desirable for the more accurate detection of the state of motion of the vehicle body 10 to determine the inward deflection $z_{rel}$ of the wheel at, at least three corners of the vehicle body 10. As was already described with reference to FIG. 6, an inward deflection sensor 21 each is therefore provided in the wheel suspensions 6, 7 and 8.

Figure 10:
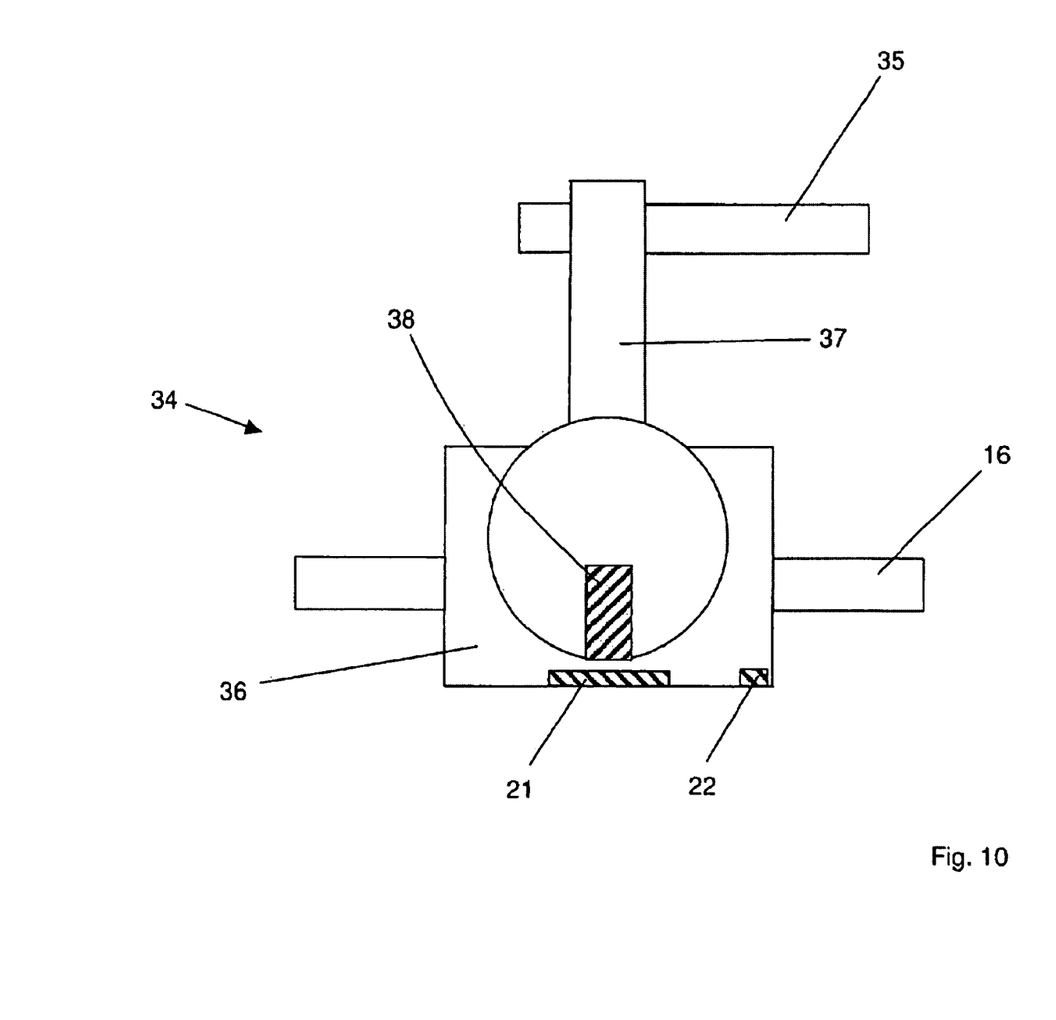
FIG. 10 is a schematic view of a ball and socket joint with sensors.

FIG. 10 shows a schematic view of a suspension arm 35, via which the wheel carrier 16 is articulated to the vehicle body 10. The suspension arm 35 is connected to the wheel carrier 16 via a ball and socket joint 34, which has a housing 36 and a ball pivot 37 mounted rotatably and pivotably therein. The suspension arm 35 and the ball and socket joint 34 are part of the wheel suspension 6. The acceleration sensor 22 and the inward deflection sensor 21 are arranged in the housing 36. The inward deflection sensor 21 is designed as an angle sensor here, and which cooperates with a signal transmitter 38, arranged in the ball pivot 37, in order to detect the deflection of the ball and socket joint 34, and hence the inward deflection $z_{rel}$ of wheel 2. The angle sensor is preferably a magnetic field-sensitive sensor and the signal transmitter is preferably a magnet here. Furthermore, the analysis means 28 may be fully or partly integrated in the housing 36 or in the ball and socket joint 34.

While specific embodiments of the invention have been shown and described in detail to illustrate the application of the principles of the invention, it will be understood that the invention may be embodied otherwise without departing from such principles.

LIST OF REFERENCE NUMBERS

1 Vehicle
2 Wheel
3 Wheel
4 Wheel
5 Wheel
6 Wheel suspension
7 Wheel suspension
8 Wheel suspension
9 Wheel suspension
10 Vehicle body
11 Front axle
12 Rear axle
13 Vehicle spring
14 Shock absorber
15 Road surface
16 Wheel carrier
17 Tire
18 Spring (tire)
19 Central axis of wheel
20 Wheel contact point
21 Inward deflection sensor
22 Acceleration sensor
23 Band pass filter
24 Differentiator
25 Band pass filter 26 Integrator
27 Subtractor
28 Analysis means
29 Velocity sensor
30 Delay member
31 Plane of wheel carriers
32 Vertical corner axis
33 Vertical corner axis
34 Ball and socket joint
35 Suspension arm
36 Ball and socket joint housing
37 Ball pivot
38 Signal transmitter/magnet

The invention claimed is:

1. A process for determining one state of motion of a vehicle body of a vehicle, which vehicle has at least one wheel spring-mounted on the vehicle body via a wheel suspension, the process comprising the steps of:
   providing at least one acceleration sensor, said at least one acceleration sensor being arranged at the wheel or in the wheel suspension;
   providing at least one path or angle sensor, said at least one path or angle sensor being arranged in the wheel suspension;
   measuring an inward deflection ($z_{rel}$) of the wheel with respect to the vehicle body with said at least one path or angle sensor;
   differentiating said inward deflection ($z_{rel}$) to determine an inward deflection velocity ($\dot{z}_{rel}$) of the wheel;
   measuring a vertical acceleration ($\ddot{z}_{wheel}$) of the wheel with said at least one acceleration sensor;
   integrating over time said vertical acceleration ($\ddot{z}_{wheel}$) of the wheel to determine a vertical velocity ($\dot{z}_{wheel}$) of the wheel; and
   determining a vertical velocity ($\dot{z}_{body}$) of the vehicle body by forming a difference of said vertical velocity ($\dot{z}_{wheel}$) of the wheel and said inward deflection velocity ($\dot{z}_{rel}$) of the wheel.

2. The process in accordance with claim 1, further comprising:
   providing the vehicle with a second wheel spring-mounted on the vehicle body via a second wheel suspension;
   a common vehicle axle joining the two wheel;
   measuring an inward deflection of the second wheel;
   determining an inward deflection velocity of the second wheel by differentiating the inward deflection of the second wheel over time;
   measuring a vertical acceleration of the second wheel;
   determining a vertical velocity of the second wheel by integrating the vertical acceleration of the second wheel over time; and
   determining a second vertical velocity of the vehicle body by forming a difference of the vertical velocity of the second wheel and the inward deflection velocity of the second wheel.

3. The process in accordance with claim 2, wherein:
   a difference of the two vertical velocities of the vehicle body is formed and a roll velocity of the vehicle body is determined by dividing this difference by a predetermined reference dimension ($S_{FA}$).

4. The process in accordance with claim 2, further comprising:
   a third wheel spring-mounted on the vehicle body via a third wheel suspension and which is part of a second vehicle axle; and
   determining a vertical acceleration of the third wheel by the measured vertical acceleration for another of the wheels being delayed in time.

5. The process in accordance with claim 3, further comprising:
   a third wheel spring-mounted on the vehicle body via a third wheel suspension and which is part of a second vehicle axle; and
   determining a vertical acceleration of the third wheel by the measured vertical acceleration for another of the wheels being delayed in time.

6. The process in accordance with claim 5, wherein:
   a velocity ($v_{x\_Fzg}$) of the vehicle is measured in a vehicle traveling direction and a duration ($\Delta t$) of said time delay is determined as a function of the velocity ($v_{x\_Fzg}$).

7. The process in accordance with claim 5, wherein:
   an inward deflection of the third wheel is measured.

8. The process in accordance with claim 7, wherein:
   an inward deflection velocity of the third wheel is determined by differentiating the inward deflection of the third wheel over time,
   a vertical velocity of the third wheel is determined by integrating the vertical acceleration of the third wheel over time;
   a third vertical velocity of the vehicle body is calculated by forming a difference of the vertical velocity of the third wheel and the inward deflection velocity of the third wheel.

9. The process in accordance with claim 1, further comprising:
   band pass filtering measurements of the inward deflection and the vertical acceleration before said differentiation over time and said integration over time.

10. The process in accordance with claim 8, wherein:
    a difference of the first and second velocities of the vehicle body is formed and a roll velocity of the vehicle body is determined by dividing this difference by a predetermined reference dimension ($S_{FA}$);
    a velocity ($v_{x\_Fzg}$) of the vehicle is measured in a vehicle traveling direction and a duration ($\Delta t$) of said time delay is determined as a function of the velocity ($v_{x\_Fzg}$),
    band pass filtering is performed on the measurements of the inward deflection and the vertical acceleration before said differentiation over time and said integration over time.

11. A vehicle suspension system for a vehicle with a vehicle body having at least one wheel which is spring-mounted on the vehicle body via a wheel suspension, the vehicle suspension system comprising:
    an acceleration sensor arranged at one of the wheel or in the wheel suspension;
    one of a path or angle sensor arranged in the wheel suspension for measuring an inward deflection of the wheel;
    a differentiator receiving measurements from said one of said path and angle sensor, said differentiator generating a deflection velocity of the wheel with respect to the vehicle body;
    an integrator integrating measurements from said acceleration sensor to create a wheel velocity of the wheel; and
    a subtracter element subtracting said deflection velocity from said wheel velocity to determine a vertical body velocity.

12. The vehicle in accordance with claim 11, wherein:
    a first band pass filter is arranged between said acceleration sensor and said integrator;
    a second band pass filter is arranged between said one of said path and angle sensor, and said differentiator.

13. The vehicle in accordance with claim 11, wherein:
the wheel is connected to the vehicle body via a suspension arm which is connected to the wheel via a ball and socket joint, said acceleration sensor and said one of said path and angle sensor being arranged in said ball and socket joint.

14. The vehicle in accordance with claim 12, wherein:
the wheel is connected to the vehicle body via a suspension arm which is connected to the wheel via a ball and socket joint, said acceleration sensor and said one of said path and angle sensor being arranged in said ball and socket joint.

15. A process for controlling a suspension of a vehicle, the process comprising the steps of:
providing a wheel spring mounted on a vehicle body movable in a suspension travel direction via a wheel suspension;
providing an acceleration sensor, said acceleration sensor being arranged one of at the wheel and in said wheel suspension;
providing one of a path sensor and an angle sensor, said one of said path sensor and said angle sensor being arranged in said wheel suspension;
repetitively measuring a deflection position of the wheel with respect to the vehicle body in the suspension travel direction with said one of said path sensor and said angle sensor;
differentiating said deflection position to determine a deflection velocity of the wheel with respect to the vehicle body in the suspension travel direction;
repetitively measuring an acceleration of the wheel in the suspension travel direction of the wheel with said acceleration sensor;
integrating said acceleration to determine a wheel velocity in the suspension travel direction;
determining a vehicle body velocity in the suspension travel direction from a difference between said wheel velocity and said deflection velocity; and
controlling the suspension of the vehicle based on said vehicle body velocity.

16. The process in accordance with claim 1, further comprising:
controlling the wheel suspension of the vehicle based on said vertical velocity ($\dot{z}_{body}$) of the vehicle body.

17. The process in accordance with claim 1, wherein said inward deflection corresponds to a vertical distance between the wheel and the vehicle body.

18. The process in accordance with claim 1, wherein said at least one acceleration sensor and said at least one path or angle sensor are located at a spaced location from the vehicle body, the wheel being connected to the vehicle body via a suspension arm which is connected to the wheel via a ball and socket joint, said at least one acceleration sensor and said path or angle sensor being arranged in said ball and socket joint.

19. The vehicle in accordance with claim 11, further comprising:
a control unit, said control unit controlling said wheel suspension based on said vertical body velocity, said acceleration sensor and said one of said path or angle sensor being located at a spaced location from the vehicle body.

20. The process in accordance with claim 15, wherein the wheel is connected to the vehicle body via a suspension arm which is connected to the wheel via a ball and socket joint, said acceleration sensor and said one of said path sensor and said angle sensor being arranged in said ball and socket joint.

* * * * *